US012338680B2

(12) United States Patent
Hay, III

(10) Patent No.: US 12,338,680 B2
(45) Date of Patent: Jun. 24, 2025

(54) TRIM FOR MOUNTING EXTERIOR COVERINGS FOR WINDOWS

(71) Applicant: HAWKES DESIGN AND CONSULTING, LLC., Charleston, SC (US)

(72) Inventor: Henry M. Hay, III, Charleston, SC (US)

(73) Assignee: HAWKES DESIGN AND CONSULTING, LLC., Charleston, SC (US)

( * ) Notice: Subject to any disclaimer, the term of this patent is extended or adjusted under 35 U.S.C. 154(b) by 191 days.

(21) Appl. No.: 18/110,757

(22) Filed: Feb. 16, 2023

(65) Prior Publication Data

US 2024/0279982 A1 Aug. 22, 2024

(51) Int. Cl.
*E06B 9/02* (2006.01)
*E06B 9/00* (2006.01)

(52) U.S. Cl.
CPC .......... *E06B 9/02* (2013.01); *E06B 2009/005* (2013.01)

(58) Field of Classification Search
CPC ........ E06B 9/00; E06B 9/02; E06B 2009/005; E06B 2009/015
See application file for complete search history.

(56) References Cited

U.S. PATENT DOCUMENTS 5,941,031 A * 8/1999 Fullwood .................. E06B 9/02 52/656.6
8,196,363 B2 * 6/2012 Hay .......................... E06B 9/02 52/204.63
8,438,802 B1 5/2013 Hay et al.
8,863,452 B1 * 10/2014 Hay, III .................... E06B 5/10 52/204.63
8,973,315 B2 3/2015 Massey
D856,536 S * 8/2019 Hay, III ....................... D25/124
10,641,035 B1 * 5/2020 Weber ....................... E06B 5/12
2007/0143961 A1 6/2007 Weber
2008/0190070 A1 8/2008 Duncan et al.
2008/0196317 A1 8/2008 Duncan et al.
2009/0108344 A1 7/2009 Hay, III et al.
2009/0229216 A1 9/2009 Duncan et al.
2009/0241421 A1 10/2009 Hay, III et al.
2010/0000181 A1 1/2010 Duncan et al.
2010/0058707 A1 3/2010 Griffith
2010/0186641 A1 7/2010 Hay, III et al.
(Continued)

*Primary Examiner* — Christine T Cajilig
(74) *Attorney, Agent, or Firm* — Bryan L. Baysinger; Maynard Nexsen PC

(57) ABSTRACT

Aspects of a storm trim system are disclosed including a lineal base, a first removable lineal cap, and second removable lineal cap. The lineal base having a length, a depth, and a stacked screw boss formed therein running perpendicular to the length and parallel to the depth. The stacked screw boss accessible via an opening extending along the lineal base parallel to the length and perpendicular to the depth. The first removable lineal cap attachable to the lineal base. The first removable lineal cap having two legs configured to press-fit into the opening. Moreover, the second removable lineal cap attachable to the lineal base for further covering the opening over the first removable lineal cap or for covering the opening when the first removable lineal cap is removed. The second removable lineal cap is configured to flex around a portion of the lineal base and grip the lineal base.

19 Claims, 13 Drawing Sheets

(56) References Cited

U.S. PATENT DOCUMENTS

| | | | | |
|---|---|---|---|---|
| 2019/0211620 | A1 * | 7/2019 | Hay, III | E06B 9/52 |
| 2020/0217079 | A1 | 7/2020 | Magas | |
| 2023/0032789 | A1 * | 2/2023 | Hay | E06B 3/222 |

* cited by examiner

TRIM FOR MOUNTING EXTERIOR COVERINGS FOR WINDOWS

FIELD

This disclosure relates to glass and window frame trim, particularly for reducing or avoiding damage to glass features, windows, and doors in homes in coastal areas prone to high winds and hurricanes and in other areas where concerns for physical security of windows and doors is elevated.

BACKGROUND

From time to time, coastal areas may experience strong winds such as during hurricanes and tropical storms. Strong winds can lift and hurl objects with sufficient force to break windows. Windows broken during a hurricane admit volumes of rain that does further damage. Moreover, volumes of wind entering a broken window increase internal pressures in the building that can cause it to come apart. Window damage from strong winds may be mitigated, however, by impact-resistant window construction or by placing a covering over the window prior to a storm.

One common type of covering for windows is a sheet of plywood but there are other coverings such as strong fabrics and panels made of metal or plastics such as LEXAN. Rigid coverings may be nailed or screwed to the window frame so as to cover the window pane. Fabrics may be fitted with grommets and then secured to the window frame by inserting anchoring screws through the grommet holes and into the framework of the building.

SUMMARY

According to its major aspects and briefly recited, herein is disclosed a storm trim system for use in attaching a panel over a window frame. The storm trim system includes a lineal base, a first removable lineal cap, and an optional second removable lineal cap. The lineal base has a length, a depth, and a stacked screw boss formed therein running perpendicular to the length and parallel to the depth. The stacked screw boss is accessible via an opening defined by the lineal base. The opening extends along the lineal base parallel to the length and perpendicular to the depth. The first removable lineal cap is attachable to the lineal base for covering the opening to the stacked screw boss. The first removable lineal cap has two legs configured to press-fit into the opening. Moreover, the second removable lineal cap is attachable to the lineal base for further covering the opening over the first removable lineal cap or for covering the opening when the first removable lineal cap is removed from the lineal base. In this way, the second removable lineal cap is configured to flex around a portion of the lineal base and grip the lineal base.

In some aspects, another storm trim system for use in attaching a panel over a window frame is disclosed. The storm trim system includes a lineal base having a length, a depth, and a stacked screw boss formed therein running perpendicular to the length and parallel to the depth. The stacked screw boss is accessible via an opening defined by the lineal base, and the opening extends along the lineal base parallel to the length and perpendicular to the depth. Moreover, a first removable lineal cap is attachable to the lineal base for covering the opening to the stacked screw boss, and the first removable lineal cap has two legs configured to press-fit into the opening. Moreover, a second removable lineal cap is attachable to the lineal base for further covering the opening over the first removable lineal cap or for covering the opening when the first removable lineal cap is removed from the lineal base. The second removable lineal cap also has a curved portion and two ledge-surfaces, each, on opposite sides of the second removable lineal cap, with one ledge-surface of the two ledge-surfaces at the end of the curved portion, and each of the two ledge-surfaces configured to engage with a corresponding ledge surface on the lineal base for attaching the second removable lineal cap to the lineal base. In this way, the second removable lineal cap is configured to flex around a portion of the lineal base and grip the lineal base with the two ledge-surfaces.

In some aspects, a method of using a storm trim system is provided. The method comprises providing an extruded lineal base having a length, a depth, and a stacked screw boss formed therein running perpendicular to the length and parallel to the depth. The stacked screw boss accessible via an opening defined by the lineal base, and the opening extending along the lineal base parallel to the length and perpendicular to the depth. The method also comprises providing a first removable lineal cap having two legs configured to press-fit into the opening and being attachable to the lineal base for covering the opening to the stacked screw boss. The method also comprises providing a second removable lineal cap being configured to flex around a portion of the lineal base and grip the lineal base and being attachable to the lineal base for further covering the opening over the first removable lineal cap or for covering the opening when the first removable lineal cap is removed from the lineal base.

These and other advantages will be apparent to those skilled in the art of window design and installation particularly for buildings in areas where security or severe weather is a concern.

BRIEF DESCRIPTION OF THE DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings.

DETAILED DESCRIPTION

Figure 1A:
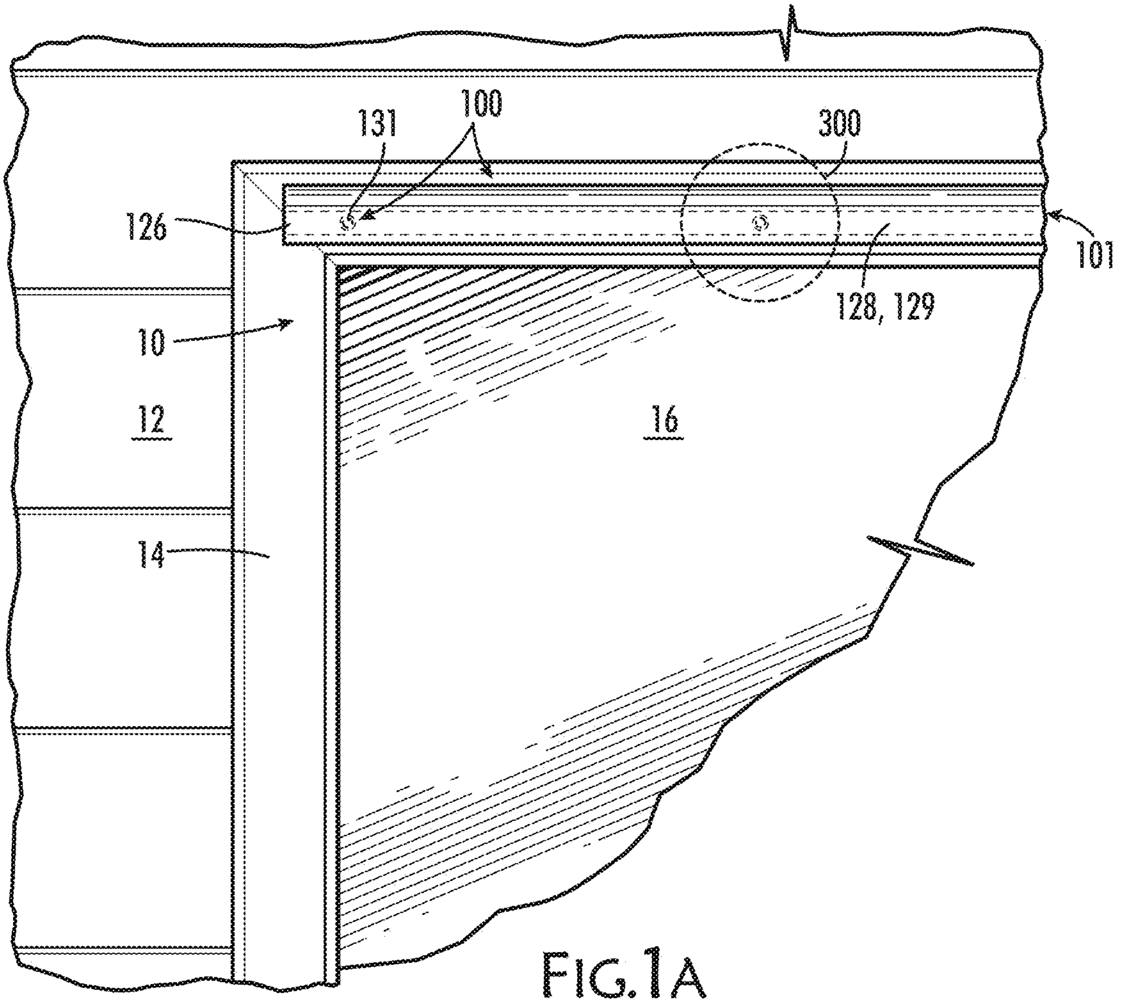
FIG. 1A is a perspective view of a partial illustration of an example building with an example lineal member of an example storm trim system over an example window according to the present disclosure.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Throughout this specification and the claims, the terms "comprise," "comprises," and "comprising" are used in a non-exclusive sense, except where the context requires otherwise. Likewise, the term "includes" and its grammatical variants are intended to be non-limiting, such that recitation of items in a list is not to the exclusion of other like items that can be substituted or added to the listed items.

I. Example Use Case Scenarios

In the past, shutters have been used to protect windows from the strong winds and the driving rains associated with storms and hurricanes. In more recent times, homeowners have used sheets of plywood to cover windows and doors to protect against flying debris. In areas where physical security threats are elevated, homeowners can be concerned about window and door breakage along with attempted break-ins.

Window and door damage from weather occurs in areas that are often along a seacoast or other environment that presents challenges of high winds and flying debris. Hurricanes are a particular problem because of the combination of high winds, heavy rainfall, and hurricane paths that are difficult to predict accurately. Current measures taken to protect windows and doors as include attaching plywood over framing, such efforts are time-consuming and the homeowner may need to evacuate before completing the task if the storm accelerates its ground speed. In areas where physical security is a concern, the owner has to balance the increased security of installing permanent bars or other window covering against the cost of installation, the effect on appearance, and the impact on the view through the window.

Improvements in glass and protective glass coatings have made it possible to obtain window glass that is much more resistant to scratches and breakage. Improvements have also been made in panels for covering windows in advance of storms, such as panels that can be installed more easily, are translucent, and that help to reduce injury and protect property. These measures, however, come at a cost.

Providing protection for vulnerable windows of a modern home near coastal areas, especially one that may have many windows and glass doors for better enjoyment of the view, can become expensive. Moreover, "outdoor architecture," common to coastal areas, favors more natural light and access to fresh air.

The need for window protection is not uniform even in the same home. With respect to hurricane protection, local building codes, for example, may use more protection for windows closer to the ground and less protection, or none at all, for windows in upper floors. Security protection for windows closer to the ground in urban areas is also greater than for windows higher up.

As such, in at least one aspect, the disclosure herein may be applied to many other glass and window protection use cases. Therefore, there is a need for better ways to provide effective protection system for glass features and windows in areas vulnerable to extreme weather and for security protection. Protection systems that are pre-installed or quickly and easily applied, that are effective in extreme weather, that provide increased security, and that are available at reasonable overall cost and that do not adversely affect the appearance of the home or office.

II. Systems and Methods

In one aspect, the protection system comprises a storm trim, for example, a pair of storms trims or a plurality of storm trims, for installation around a window. That storm trim, in one aspect, is a lineal construction member for use around a pane of glass to serve as an attachment point or receptacle for anchor screws that hold a panel adjacent to a window for protection of that window against impact of objects carried by strong winds. In another aspect, the lineal member includes a lineal base and removable lineal caps, for example, two or more removable lineal caps. The lineal base and/or the removable lineal caps may be extruded vinyl. Moreover, the lineal member may be added to a window frame, for example, on the casing along a window, as a separate trim piece, may be added to the stile or to the surroundings of the glazing or glass features in a door, transom, or side light, or it may be added to the framing, sheathing, or the framing of the building at the opening for the window. In another aspect, the lineal base serves to receive and hold anchoring screws and receive installation screws, and the removable lineal cap(s) serve(s) to cover the lineal base, when the lineal base is not in use, to enhance the exterior appearance of the window areas as well as to keep moisture and dirt out of the lineal base.

In particular, in one aspect, the lineal base includes a stacked screw boss to receive the anchor screws, to hold them fast within the lineal base and without further penetration into the house framing or other structure of the house. Importantly, anchor screws may be driven into the lineal base at any point along its length. In another aspect, the removable lineal cap(s) prevent(s) water intrusion into the lineal base where the stacked screw boss, for example, is situated.

In one aspect, the stacked screw boss of the lineal base is configured to receive the installation screws, as they further penetrate into the house framing or other structure of the house, to rigidly and securely install the storm trim system described herein. Importantly, installation screws may be driven into the lineal base through the stacked screw boss at any point along its length. Also, because the remainder of the screw boss does not require or permit penetration of the anchor screws into the framework of the building, accelerated wood rot from water damage due to screw holes is avoided.

In one aspect, the storm trim system or components thereof as described herein may be made and/or extruded to match the exterior appearance of a residence or commercial building. For example, it may be selected to match the color of a vinyl window frame so that it looks like part of the usual trim structures around windows.

In one aspect, the storm trim system is only needed on two or more sides of a window. For example, in one aspect, the storm trim system may comprise a storm trim on opposite jambs of a window on the casing of the window frame. In another aspect, for example, the storm trim system may comprise a storm trim on the casing beneath the drop cap of a window frame and an opposing storm trim on the sheathing adjacent to a window and beneath the subsill of a window frame. For example, in one aspect, the storm trim system may comprise a storm trim on opposite jambs of a window on the casing of the window frame, a storm trim on the casing beneath the drop cap of a window frame, and a storm trim on the sheathing adjacent to a window and beneath the subsill of a window frame.

Referring to methods herein, in one aspect, a method of using a storm trim system is disclosed. In one aspect, the method comprises providing the storm trim system having at least one extruded lineal member including a lineal base and removable lineal cap(s) having a length, a depth, and a stacked screw boss inside the lineal base running perpendicular to the length and parallel to the depth. The method also comprises, in another aspect, installing the storm trim system or components thereof onto a building.

III. With Reference to the Figures

U.S. Pat. Nos. 10,604,989, 10,641,035, 8,863,452, 8,789,324, 8,196,363, and 8438802, are assigned to the Applicant of the present application, and are incorporated herein in their entirety by reference.

The term "extruded" is used herein for convenience but jambs, sills and headers may be formed in any way customary in the industry, for example, pultruded and co-extruded with other materials. Resin fusion and vacuum fusion methods are also envisioned.

The term "frame" as used herein, and used in connection with a window or door, such as a "window frame" an "opening frame" or a "door frame," refers to the structure that is attached to a building where an aperture is defined by the walls of the building for receiving a window or door (or receiving a vent or an appliance such as a wall-mounted air conditioner). The frame is typically a four-sided structure that is sealed to the opening made for it and that holds the window, door, vent, or appliance.

The term "building" will be used here for convenience to mean any structure with openings defined by its walls. The structure includes by way of example, and not of limitation, homes, apartment buildings, and commercial buildings. The word "walls" refers to barriers such as walls, ceilings, concrete stone or slab, brick or masonry, floors, reinforcements, and finishes, that are positioned between the inside of the building and its outside.

The term "window" will be used to refer to a finished or semi-finished opening defined by a wall as defined herein, such as a window in a wall, a window in a door, a skylight in a ceiling, or a sliding glass door in a wall, where the window has a covering that admits light, unlike the opaque material of the wall, door frame, and roof.

The term "door" will be used to indicate an entry and egress point in a building, and shall include framing along with the ability to cover the door with the disclosure herein.

The term "screw boss" is a physical structure that grips the threads of a screw being driven into it so that, once the screw has been inserted into or through the screw boss, the screw boss resists the removal of the screw more when the screw is pulled than when the screw is unscrewed.

An "insertable screw boss" is a screw boss that has been separately extruded, molded, cast, forged, or welded so that it can be inserted into a channel and is otherwise functionally the same as a screw boss extruded as an integral part of that channel, but allowing for further strengthening or reinforcing.

The window or door frames on the lower levels of a multi-level home or office may have extra protection against high winds, blowing dirt, sand and debris. That extra protection can be provided by impact resistant glass and by window frames and door frames that permit easily-attached exterior panels. Upper floors in the same home or office building may have less protection as appropriate or no protection. Protection for windows and doors on one side of the home or office can be greater on, for example, the windward side, than for the windows and doors on the other side. Regardless of the customization of different windows, the external appearance can be uniform or symmetrical or understated through the systems and methods of the present disclosure.

Accordingly, a service provider can evaluate the relative level of safety protection for the window of a designed structure and specify the level of protection appropriate for that window and implement the systems and methods of the present disclosure. The windows of the finished structure can have effectively the same external appearance and style, as determined by the frontal appearance of the window frame (when a panel is not in place, for example), despite the different examples according to the present disclosure.

When a storm approaches, the owner simply may apply panels to the more vulnerable windows, such as those to the windward side, for example, and perhaps to windward windows higher up that are easily reached, such as those opening to an upstairs balcony or deck. The owner may attach panels on the insides of upstairs windows as a precaution against wind-blown debris breaking those windows according to the present disclosure.

An advantage of being able to customize the protection provided by windows, doors and other openings of a building is that the overall cost of protection is reduced by applying greater window and door protection to those windows and doors that are more vulnerable and less protection or none to those windows that are not likely to be damaged. Being able to customize the protection provided by different windows and doors of a building and provide a pleasing and, if desirable, a uniform or symmetrical external appearance is also an advantage. That said, for those windows and doors that would be covered by panels on the approach of bad weather or when there are security concerns, the frame profile will have the desired aesthetic exterior features as the frame of any other window or door of that building. However, there is an interior screw boss to provide additional holding power for screws that are to hold a panel to the window or door and possibly for use in an interior for holding an interior panel.

In a variation of the foregoing example, the upstairs window frames and the downstairs window frames may be customized to hold panels on the inside of the window, and the downstairs windows may be customized to hold panels outside the windows.

The present system allows for customization of what may otherwise appear to be uniform-looking windows and doors by enabling attachment of panels inside or outside of the window or door using frames with co-extruded screw bosses or inserted bosses, and by selecting a strengthened screen or barrier (herein "panel"), for protecting windows of the home or building. Yet the windows and doors would have a uniform or symmetrical appearance, thus preserving the exterior quality and aesthetics of the structure.

Referring now to FIG. 1A, a perspective view of a partial illustration of an example building with an example lineal member of an example storm trim system over an example window according to the present disclosure is shown. In particular, in FIG. 1A there is shown the corner of a window 10 of a building 12. The window 10 has a window frame 14 and a window pane 16. A storm trim system 100 is shown added to the window frame 14. As illustrated, the storm trim system 100 includes a lineal member 101 having a lineal base 126 and removable lineal caps 128 and 129 (best seen in FIG. 2). More specifically, in FIG. 1A, the removable lineal caps 128 and 129 are shown as see-through to reveal the installation screws 131 (best seen in FIG. 4A) inserted through the lineal base 126 to install and add the lineal member 101 to the window 10.

The term "lineal" in lineal member 101, lineal base 126 and removable lineal caps 128 and 129 refers to an extruded construction member having a uniform cross section perpendicular to its major dimension which major dimension is much longer than its other two dimensions; that is, the plane of any cross section perpendicular to the major dimension of the lineal base 126 and the removable lineal caps 128 and 129 is defined by a line parallel to the major dimension. The lineal base 126 and the removable lineal caps 128 and 129 are made of a thermosetting polymer, such as vinyl. The removable lineal caps 128 and 129 serve to cover lineal base 126 and to keep moisture and dirt out of the lineal base 126 when it is not being used to receive the installation screws 131 or the anchoring screws 132 (best seen in FIG. 4B) for the storm trim system 100.

When the storm trim system 100 is added to the window frame 14, for example, as illustrated in FIGS. 1A, the removable lineal caps 128 and 129 need be removed from the lineal base 126 and stored and then the lineal base may be installed using the installation screws 132. The installation screws 131 may be inserted anywhere along the lineal base 126 because its cross section is uniform over that length. If holes have been pre-drilled in the building 12 or the window frame 14, or if anchors have been pre-installed, the installation screws 131 may be inserted into those pre-drilled holes or anchors after traversing the lineal base 126.

Figure 1B:
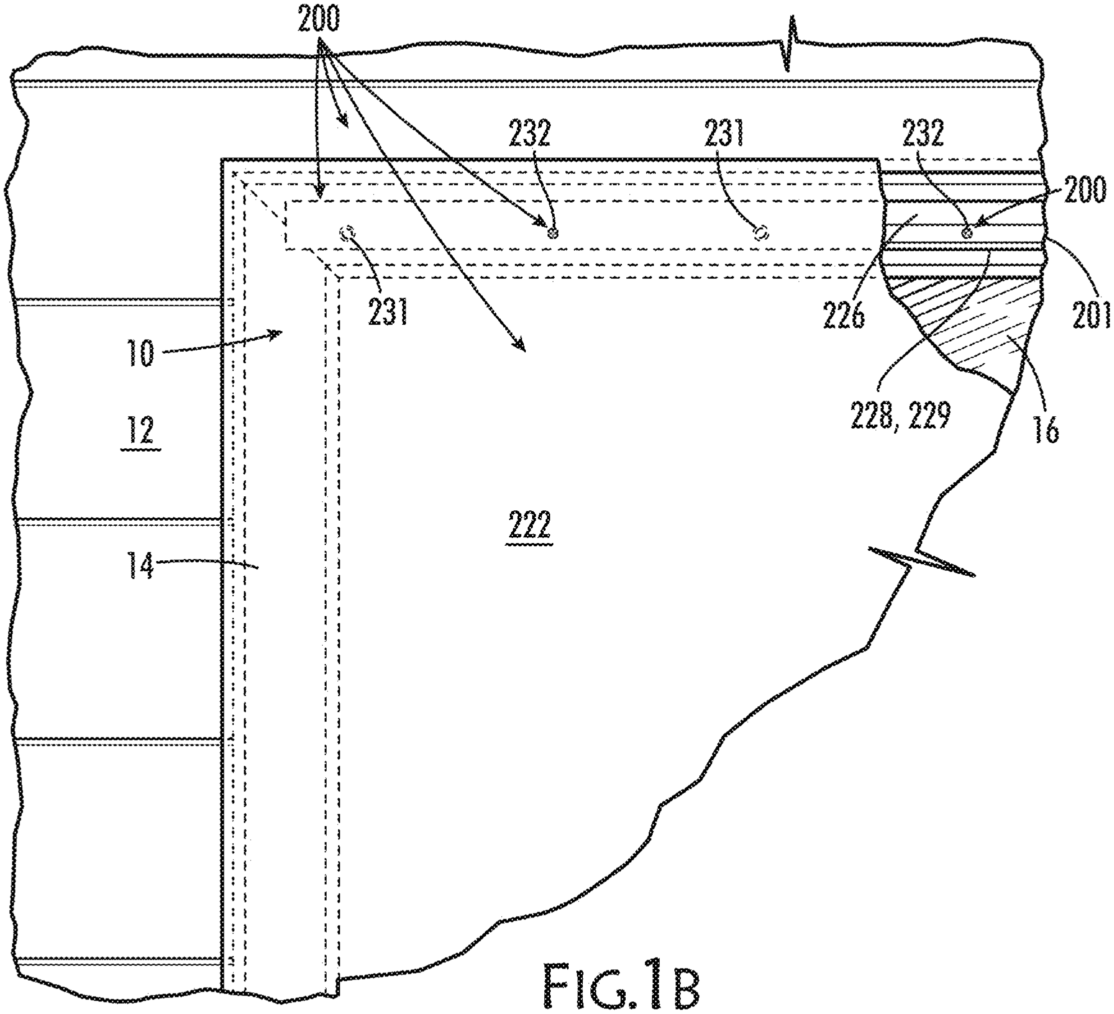
FIG. 1B is a perspective view of a partial illustration of the building and the window of FIG. 1A showing an example panel of an example storm trim system added to the window and partially cut away to reveal the window behind the panel according to the present disclosure.

Referring now to FIG. 1B, a perspective view of a partial illustration of the building and the window of FIG. 1A showing an example panel of an example storm trim system added to the window and partially cut away to reveal the window behind the panel according to the present disclosure is shown. In particular, in FIG. 1B, there is shown a panel 222 of a storm trim system 200 added to the window frame 14. As illustrated, the storm trim system 200 includes a panel 222 and a lineal member 201 having a lineal base 226, removable lineal caps 228 and 229, installation screws 231, and anchoring screws 232. More specifically, in FIG. 1B, the removable lineal caps 228 and 229 are removed to allow for anchoring screws 232 to be inserted through the lineal base 226 to hold the panel 222 that protects the window pane 16 from impact caused by high winds.

Figure 2:
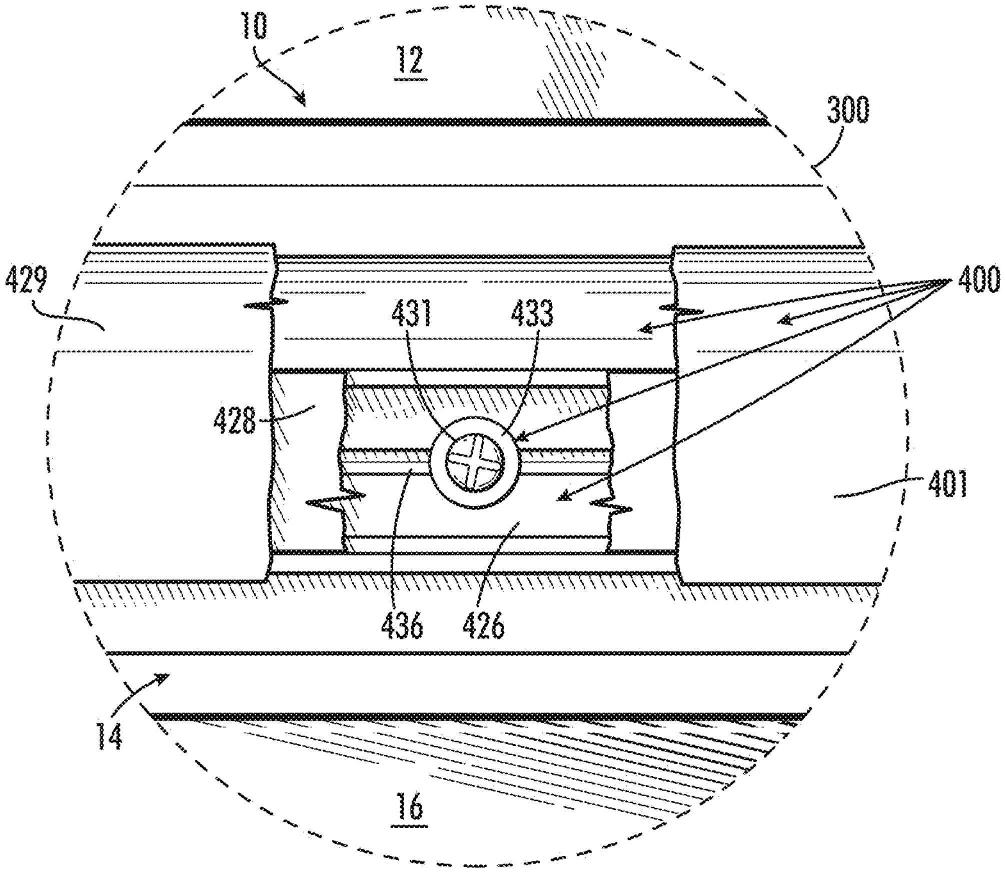
FIG. 2 is a magnified perspective view of a partial illustration of the detail of FIG. 1A showing an example first removable lineal cap and an example second removable lineal cap of an example lineal member added to the window and partially cut away to reveal an example lineal base with integral stacked screw boss and example installation screw(s) behind the removable lineal caps according to the present disclosure.

When high winds, such as those associated with a hurricane or tropical storm, are forecast, those whose homes or commercial building that are equipped with the present storm trim system 200 may use the time prior to the onset of the storm to cover the exterior windows 10. When the storm trim system 200 is added to the window frame 14, for example, as illustrated in FIGS. 1 and 2, the removable lineal caps 228 and 229 need be removed from the lineal base 226 and stored and then a panel 222 can be attached to the window frame 14 using the anchoring screws 232. The anchoring screws 232 may be inserted anywhere along the lineal base 226 because its cross section is uniform over that length. If holes have been pre-drilled in the panel 222, the anchoring screws 232 may be inserted into those pre-drilled holes and then inserted into the lineal base 226. Washers of any size appropriate for the lineal base may be used.

Referring now to FIG. 2, a magnified perspective view of a partial illustration of the detail of FIG. 1A showing an example first lineal cap and an example second lineal cap of an example lineal member added to the window and partially cut away to reveal an example lineal base with integral stacked screw boss and example installation screw(s) behind the lineal caps according to the present disclosure is shown. In particular, in FIG. 2, there is shown detail 300 of FIG. 1A. As illustrated, the detail 300 shows a storm trim system 400 added to the window frame 14. As illustrated, the storm trim system 400 includes a lineal member 401 having a lineal base 426, a first removable lineal cap 428, a second removable lineal cap 429, installation screws 431, and washer 433. More specifically, in FIG. 2, the first removable lineal cap 428 and the second removable lineal cap 429 are shown as cut-away to reveal the installation screws 431 (with washers 433) inserted through the lineal base 426 to install and add the lineal member 401 to the window 10.

Figure 3:
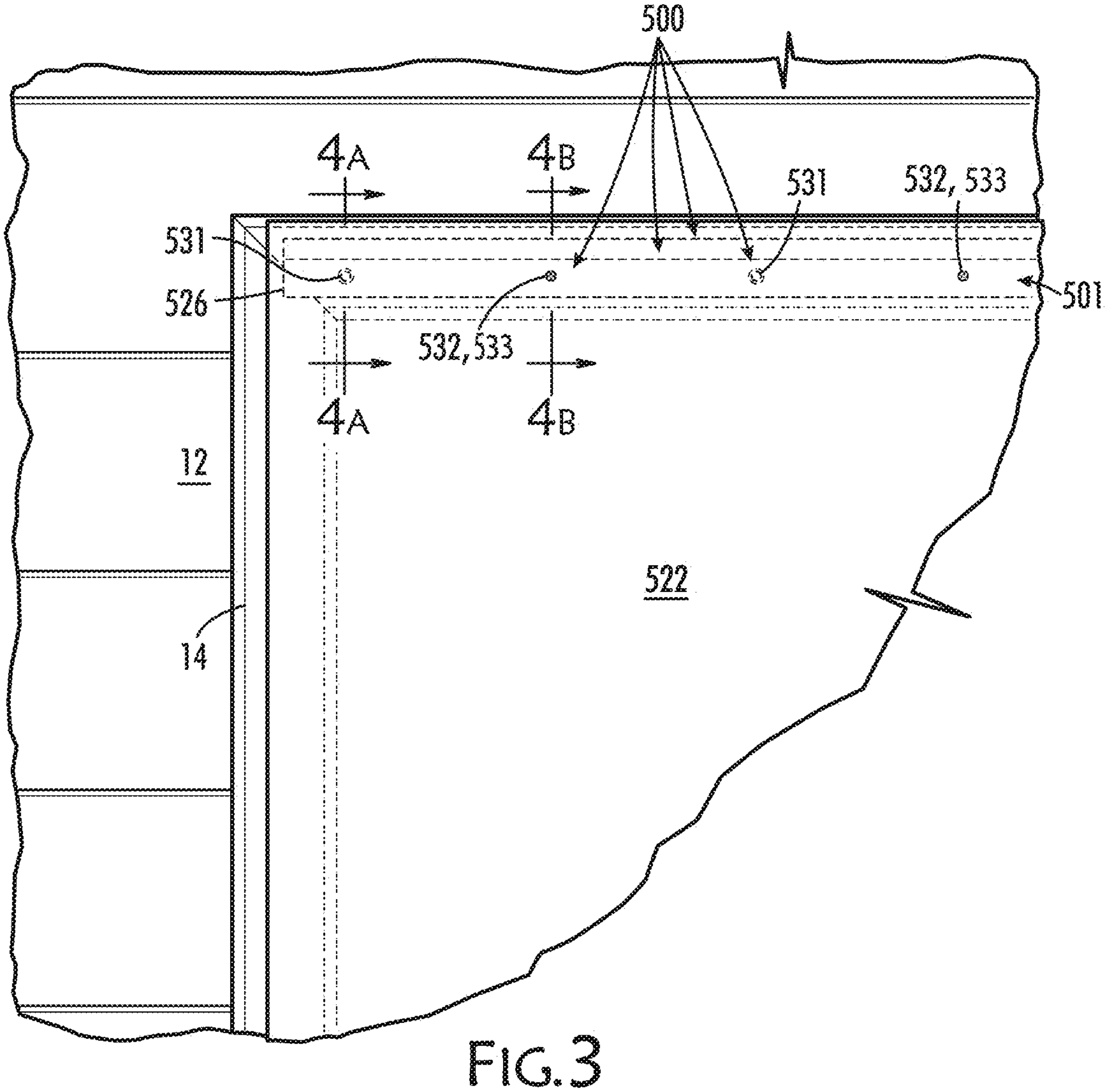
FIG. 3 is a perspective view of a partial illustration of the building and the window of FIG. 1A showing an example lineal member with anchoring screw(s) and a panel added to the window via example installation screws according to the present disclosure.

Referring now to FIG. 3, a perspective view of a partial illustration of the building and the window of FIG. 1A showing an example lineal member with anchoring screw(s) and a panel added to the window via example installation screws according to the present disclosure is shown. In particular, in FIG. 3, there is shown a storm trim system 500 added to the window frame 14. As illustrated, the storm trim system 500 includes a panel 522 and a lineal member 501 having a lineal base 526, removable lineal caps 528 and 529 (not shown), installation screws 531, anchoring screws 532, and washers 533. More specifically, in FIG. 3, the panel 522 is shown as see-through to reveal the installation screws 131 (best seen in FIG. 4A) inserted through the lineal base 126 to install and add the lineal member 101 to the window 10. Moreover, the anchoring screws 232 traverse the panel 522 and screw into the lineal base 226 to hold the panel 522 that protects the window pane 16 from impact caused by high winds.

Figure 4A:
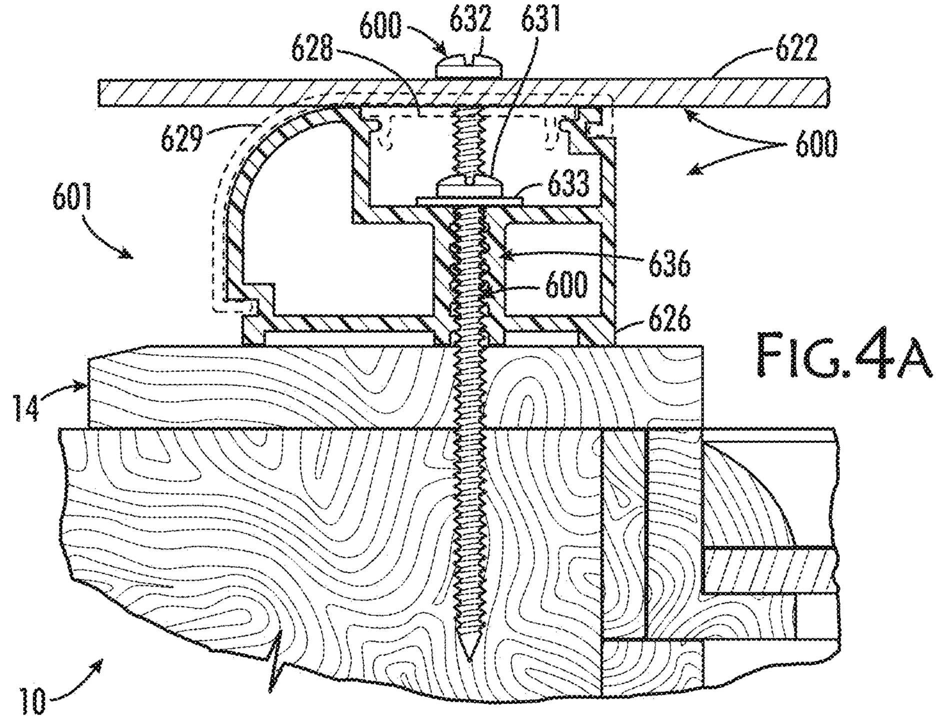
FIG. 4A is a cross-sectional view of an illustration of an example lineal member with anchoring screw(s) and a panel added to the window via example installation screw(s) and taken along line 4A-4A of FIG. 3 according to the present disclosure.
Figure 4B:
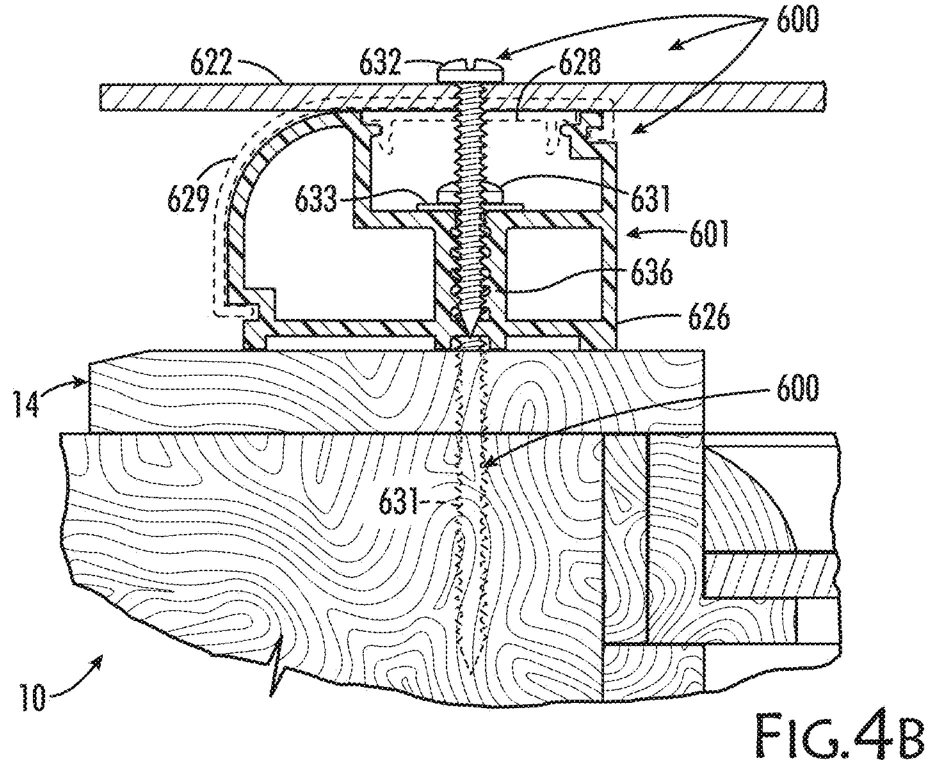
FIG. 4B is a cross-sectional view of an illustration of an example lineal member with anchoring screw(s) and a panel added to the window via example installation screw(s) and taken along line 4B-4B of FIG. 3 according to the present disclosure.

Referring now to FIGS. 4A and 4B, FIG. 5A is a cross-sectional view of an illustration of an example lineal member with anchoring screw(s) and a panel added to the window via example installation screw(s) and taken along line 4A-4A of FIG. 3 according to the present disclosure, and FIG. 4B is a cross-sectional view of an illustration of an example lineal member with anchoring screw(s) and a panel added to the window via example installation screw(s) and taken along line 4B-4B of FIG. 3 according to the present disclosure. In particular, in FIGS. 4A and 4B, there are shown two different cross-section views taken at different lengths along a storm trim system 600 added to the window frame 14. As illustrated, the storm trim system 600 includes a panel 622 and a lineal member 601 having a lineal base 626 with integral stacked screw boss 636, a first removable lineal cap 628, a second removable lineal cap 629, installation screws 631, anchoring screws 632, and washers 633.

More specifically, in FIG. 4A, the cross-section is shown at line 4A-4A of FIG. 3 at a length along the storm trim system 600 where an installation screw 631 with washer 633 is inserted through the stacked screw boss 636 of the lineal base 626 to install and add the lineal member 601 to the window 10. Moreover, in FIG. 4B, the cross-section is shown at line 4B-4B of FIG. 3 at a length along the storm trim system 600 where an anchoring screw 632 traverses the panel 622 and is inserted into but not through the stacked screw boss 636 of the lineal base 626 to hold the panel 622 that protects the window pane 16 from impact caused by high winds.

Figure 5:
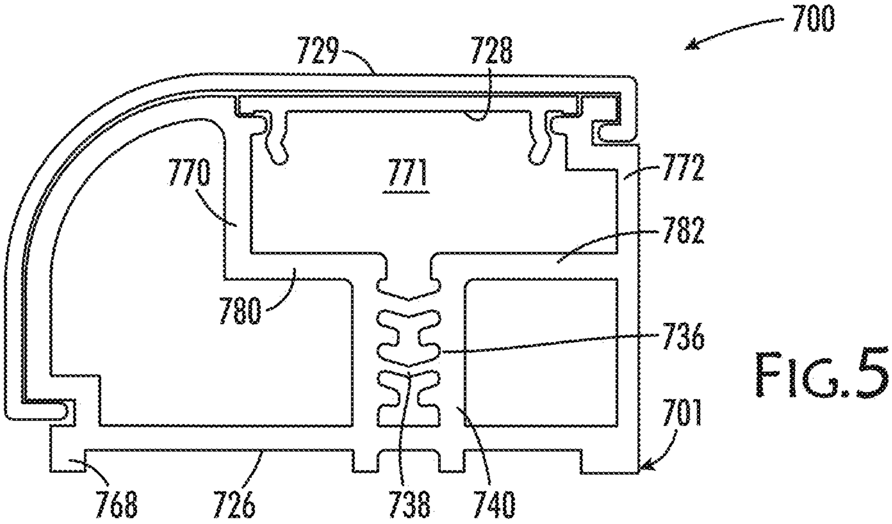
FIG. 5 is a cross-sectional view of an illustration of an example lineal member of an example storm trim system according to the present disclosure.

Referring now to FIG. 5, a cross-sectional view of an illustration of an example lineal member of an example storm trim system according to the present disclosure is shown. In particular, in FIG. 5, there is shown a cross-section view taken at a length along a free standing storm trim system 700. As illustrated, the storm trim system 700 includes a a lineal member 701 having a lineal base 726 with integral stacked screw boss 736, a first removable lineal cap 728, and a second removable lineal cap 729.

More specifically, the lineal base 726 includes a stacked screw boss 736 for receiving the installation screws and the anchoring screws. A screw boss is a channel or void defined by barriers 738 and walls 740 in an extrusion which accepts a certain diameter of the installation screws and the anchoring screws. The present stacked screw boss 736 is a series of channels or voids, one channel on top of the other with generally co-planar walls 740 and separated by a series of barriers 738. The stack of channels of the stacked screw boss 736 may accept a long metal installation screw or a shorter metal anchoring screw. The stacking of channels to form the stacked screw boss 736 provides increasing resistance with each additional screw boss to provide great holding power, holding power sufficient for very strong winds. The number of channels in the stacked screw boss 736 is at least two and may be as many as five. The holding power of the stacked screw boss 736 is a function of the number of channels, the thickness of each barrier 738, the thickness and shape of the walls 740 of each channel, and the material of the stacked screw boss 736. Additionally, the cross sections of each channel need not be uniform. Some walls 740 may be formed narrow so that additional resistance may be provided by lateral pressure of walls 740 on the threads of the screws in addition to the pressure applied to screws advances through a succession of barriers in the stacked screw boss 736.

Importantly, the stacked screw boss 736 is long enough (a stack of sufficient major dimension) so that anchoring screws 732 remain within the stacked screw boss 736 when fully seated and the ends of their threads do not penetrate beyond the final barrier 738. The lineal base 726 may include a structure(s) for supporting the stacked screw boss 736. For example, the lineal base includes a housing 768 and may have a recess 771 defined by extruded lineal beams 770, 772. The housing 768 may also include lateral lineal supports 780 and 782 to tie the lineal beams 770, 772 and the screw boss 736 to the housing 768. These features give the housing 768 of the lineal base 726 rigidity and strength to hold stacked screw boss 736 against the pull of the panel on the anchoring screws during high winds. Moreover, the storm trim system 700 shown in FIG. 5 is an example of a storm trim system shown with one type of bull-nose, rounded or curved profile, and may have a region or portion that mimics flat casing, but various extrusions could be added to the housing 768 or to the removable lineal caps 728, 729 to allow the storm trim system 700 to be modified to look like other window designs. Furthermore, it is only after removable lineal caps 728 and 729 are removed that the installation screws and the anchoring screws may be inserted through the panel into the stacked screw boss 736.

Figure 6A:
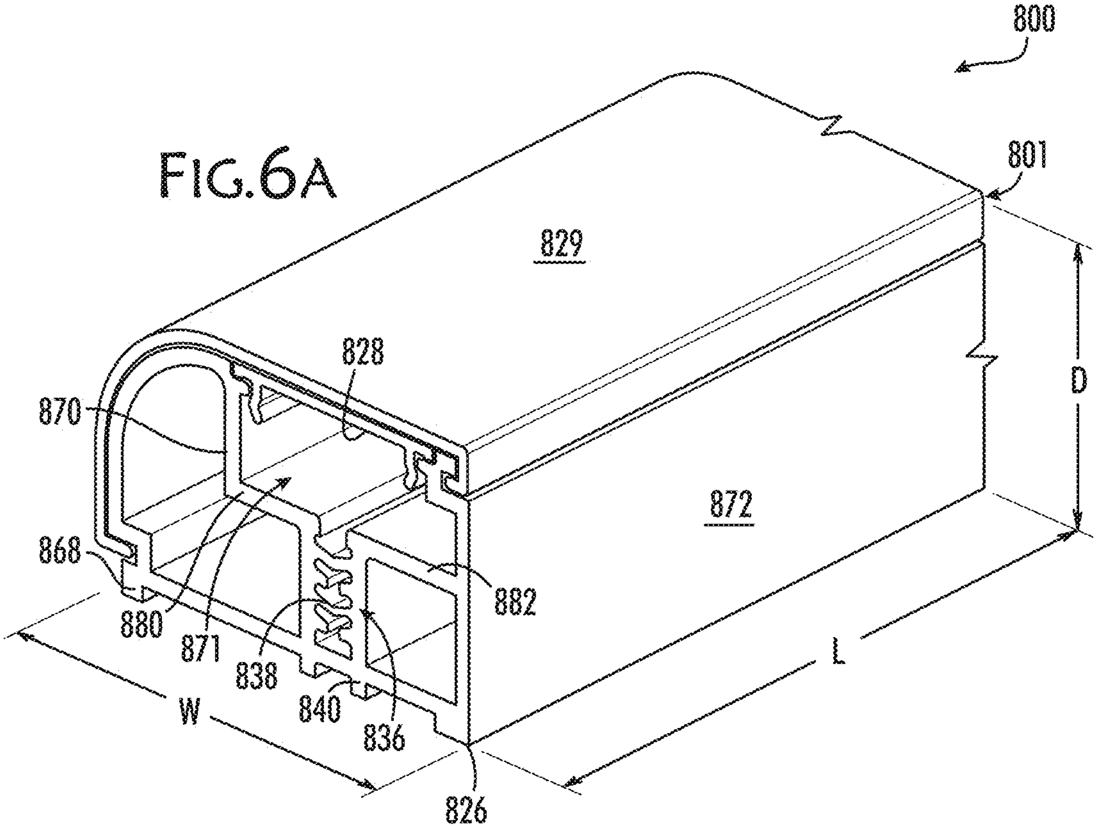
FIG. 6A is a perspective view of a partial illustration of an example lineal member of an example storm trim system according to the present disclosure.
Figure 6B:
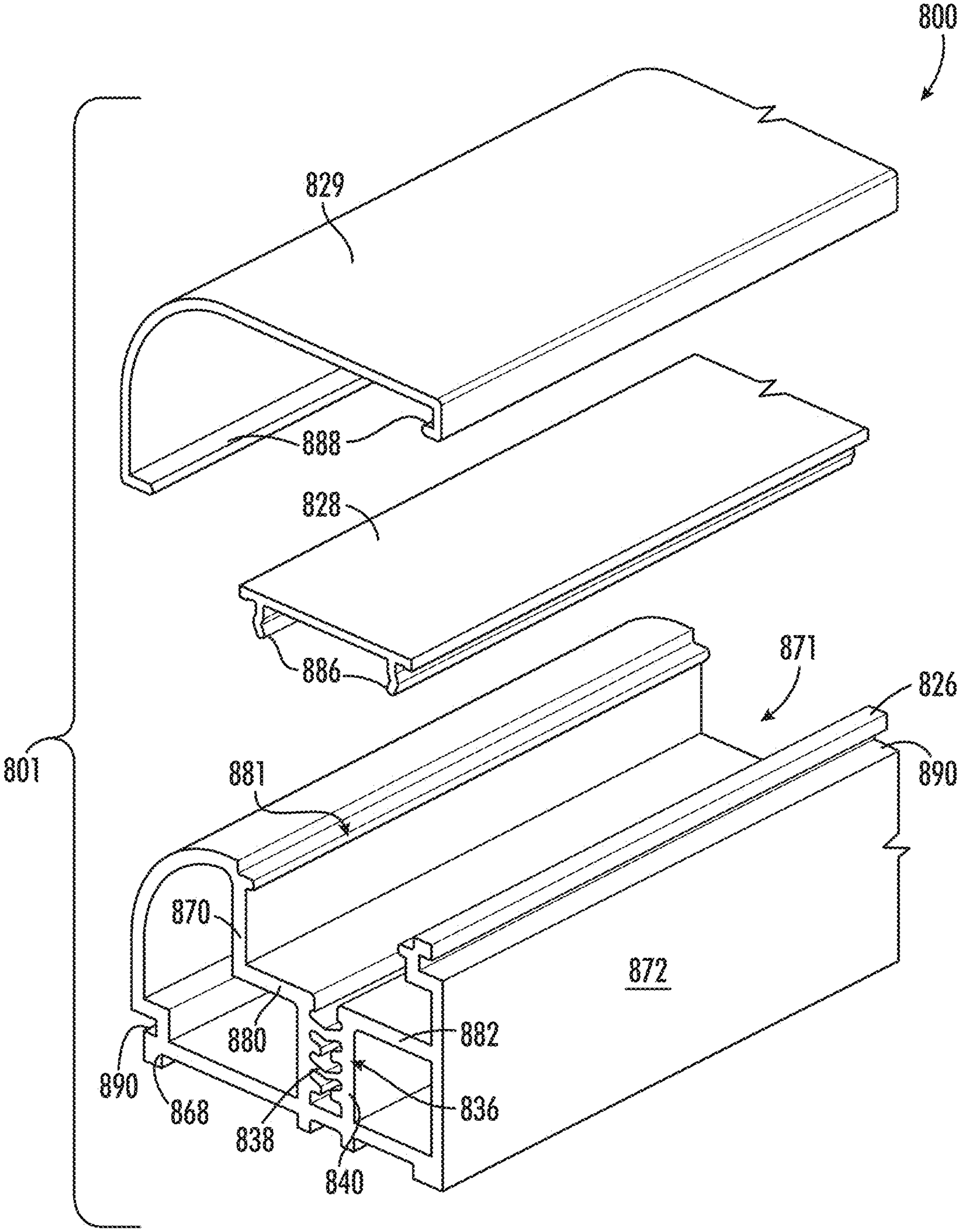
FIG. 6B is an exploded perspective view of a partial illustration of an example lineal member of an example storm trim system according to the present disclosure.

Referring now to FIGS. 6A and 6B, FIG. 6A is a perspective view of a partial illustration of an example lineal member of an example storm trim system according to the present disclosure, and FIG. 6B is an exploded perspective view of a partial illustration of an example lineal member of an example storm trim system according to the present disclosure. In particular, in FIGS. 6A and 6B, there is shown a free standing storm trim system 800. As illustrated, the storm trim system 800 includes a lineal member 801 having a lineal base 826 with integral stacked screw boss 836, a first removable lineal cap 828, and a second removable lineal cap 829.

More specifically, in FIG. 6A, the lineal member 801 of the storm trim system 800 is shown fully assembled, and the storm trim member 801 includes a lineal base 826 having a length, L, a depth, D, and a width, W, and a stacked screw boss formed therein running perpendicular to the length and parallel to the depth. The stacked screw boss is accessible via an opening 881 defined by the housing 868 of the lineal base 826 and leading into the recess 871. The opening 881 to the recess 871 extends along the entire lineal base 826 parallel to the length and perpendicular to the depth.

Moreover, in FIG. 6B, the first removable lineal cap 828 and the second removable lineal cap 829 are shown separated from the rest of the lineal member 801. The first removable lineal cap 828 is configured to attach to the lineal base 826 for covering the opening 881 to the stacked screw boss 836. The first removable lineal cap 828 has two legs 886 configured to press-fit into the opening 881. The second removable lineal cap 829 also is configured to attached to the lineal base 826 for further covering the opening 881 over the first removable lineal cap 828 or for covering the opening 881 when the first removable lineal cap 828 is removed from the lineal base 826. The second removable lineal cap 829, specifically, is configured to flex around a portion of the lineal base 826 and grip the lineal base 826. Furthermore, the second removable lineal cap 829 has two ledge-surfaces 888 each on opposite sides of the second removable lineal cap 829, and each configured to engage with a corresponding ledge surface 890 on the lineal base 826 for attaching the second removable lineal cap 829 to the lineal base 826.

Figure 7A:
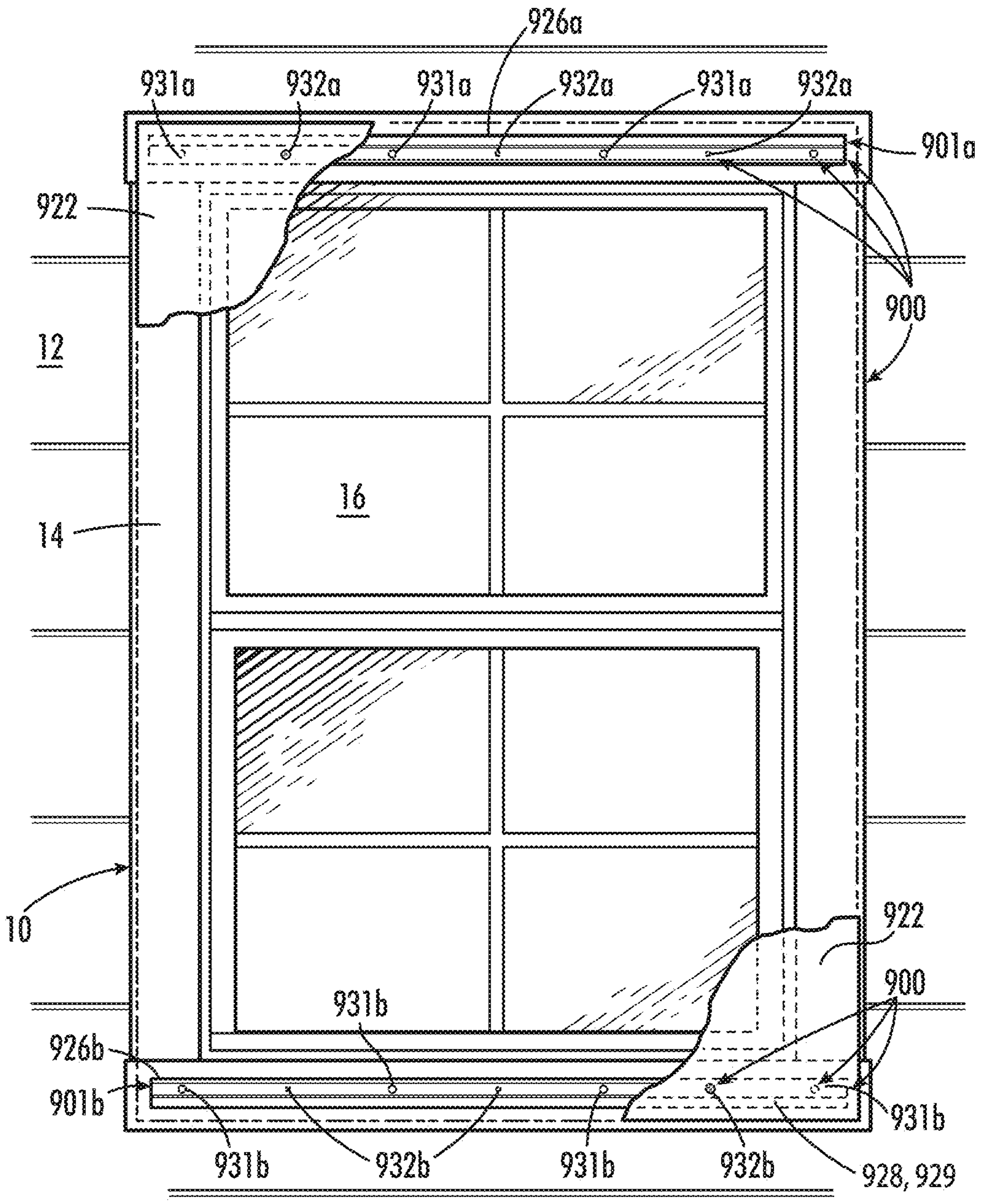
FIG. 7A is a perspective view of an illustration of an example storm trim system over an example window showing through an example panel to reveal the window behind the panel according to the present disclosure.
Figure 7B:
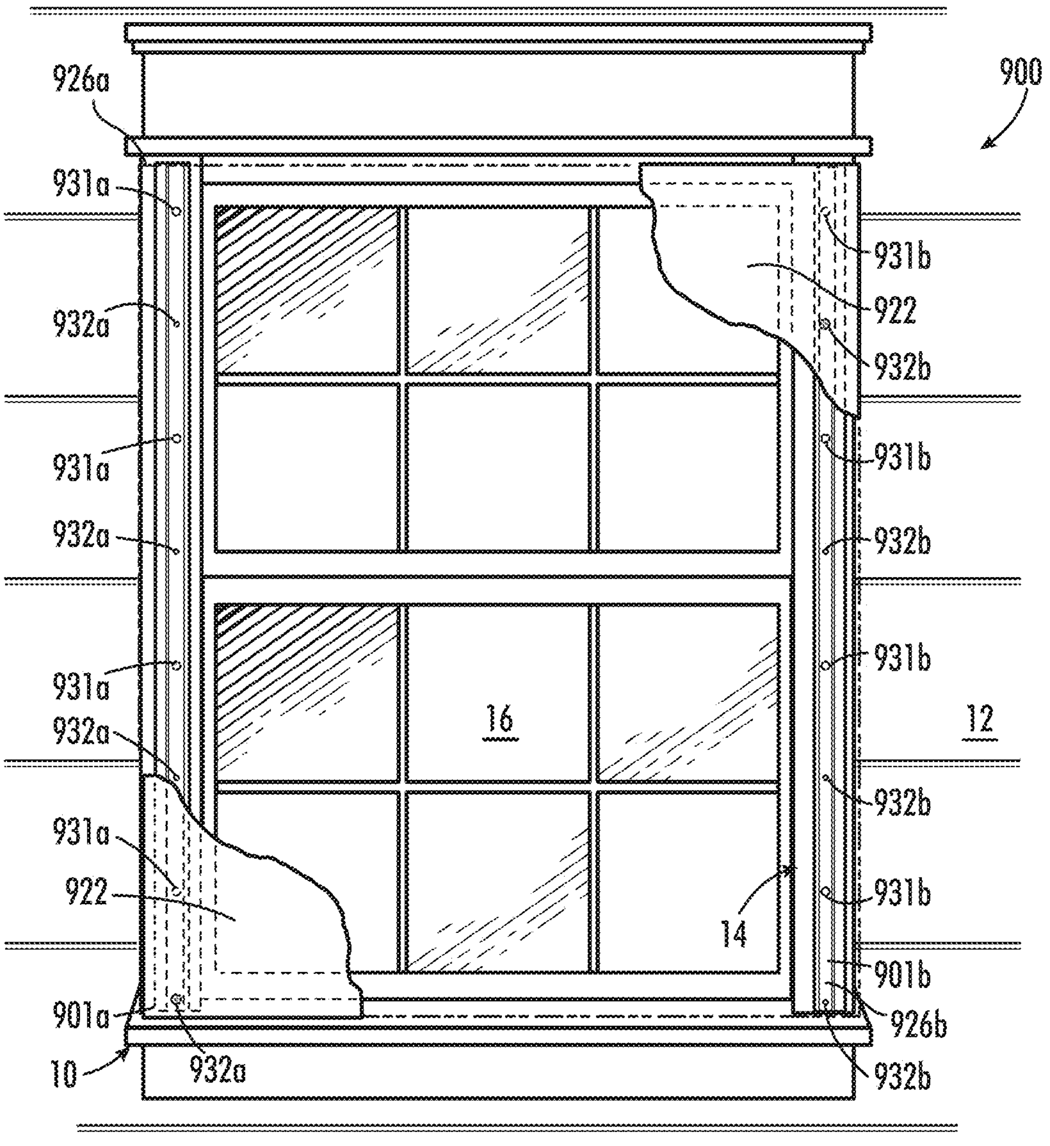
FIG. 7B is a perspective view of an illustration of another example storm trim system over an example window showing through an example panel to reveal the window behind the panel according to the present disclosure.

Referring now to FIGS. 7A and 7B, FIG. 7A is a perspective view of an illustration of an example storm trim system over an example window showing through an example panel to reveal the window behind the panel according to the present disclosure, and FIG. 7B is a perspective view of an illustration of another example storm trim system over an example window showing through an example panel to reveal the window behind the panel according to the present disclosure. In particular, in FIGS. 7A and 7B, there is shown a storm trim system 900 added to the window frame 14. As illustrated, the storm trim system 900 includes a panel 922, a first lineal member 901*a* and a second lineal member 901*b*, each, having, a lineal base 926, a first removable lineal cap 928 (not shown), a second removable lineal cap 929 (not shown), installation screws 931, and anchoring screws 932.

More specifically, in FIG. 7A, the first lineal member 901*a* is added on the casing beneath the drop cap of the window frame 14 and the second lineal member 902*b* is added on the casing beneath the subsill of the window frame 14. Moreover, in FIG. 7B, the first lineal member 901*a* and the second lineal member 901*b* is added on opposite jambs of the window 10 on the casing of the window frame 14.

Figure 8A:
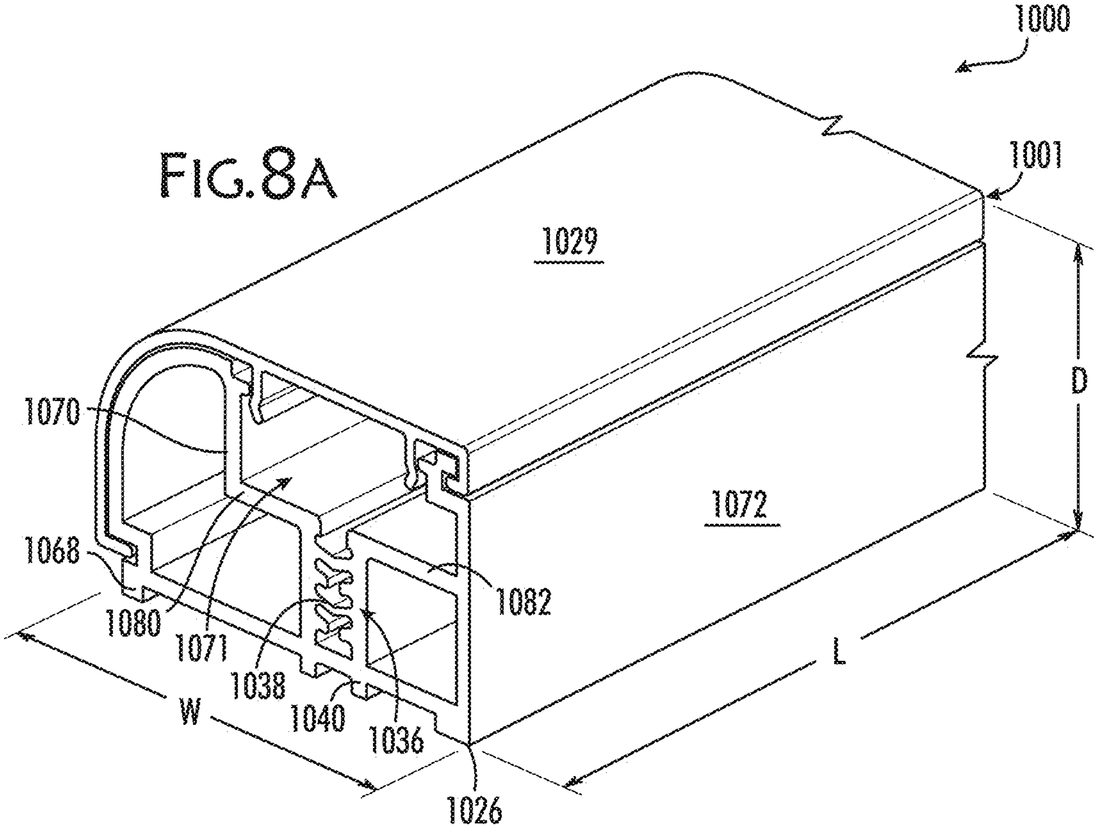
FIG. 8A is a perspective view of a partial illustration of an example lineal member of an example storm trim system according to the present disclosure.
Figure 8B:
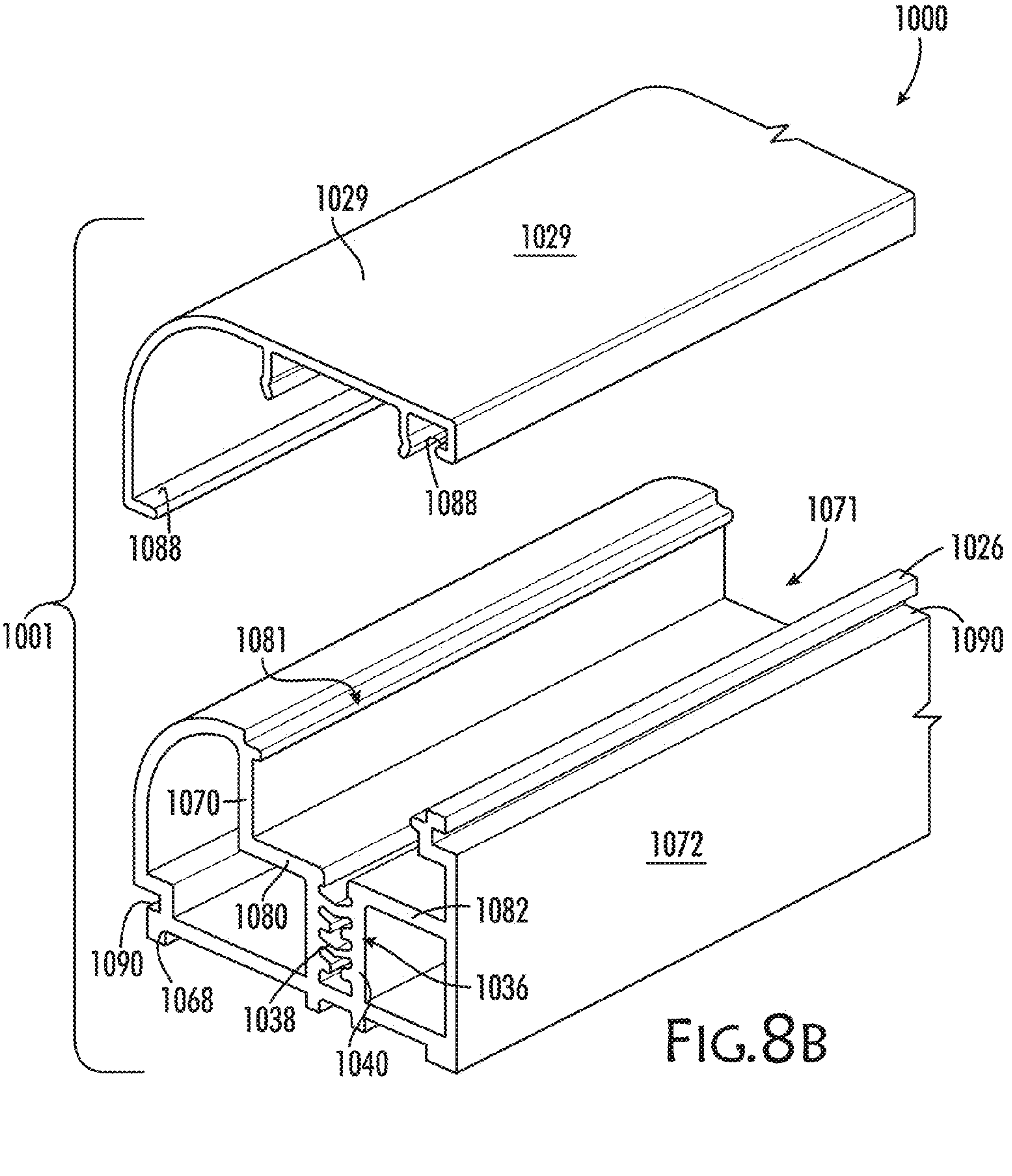
FIG. 8B is an exploded perspective view of a partial illustration of an example lineal member of an example storm trim system according to the present disclosure.

Referring now to FIGS. 8A and 8B, FIG. 8A is a perspective view of a partial illustration of an example lineal member of an example storm trim system according to the present disclosure, and FIG. 8B is an exploded perspective view of a partial illustration of an example lineal member of an example storm trim system according to the present disclosure. In particular, in FIGS. 8A and 8B, there is shown a free standing storm trim system 1000. As illustrated, the storm trim system 1000 includes a lineal member 1001 having a lineal base 1026 with integral stacked screw boss 1036, and a removable lineal cap 1029.

More specifically, in FIG. 8A, the lineal member 1001 of the storm trim system 1000 is shown fully assembled, and the storm trim member 1001 includes a lineal base 1026 having a length, L, a depth, D, and a width, W, and a stacked screw boss formed therein running perpendicular to the length and parallel to the depth. The stacked screw boss is accessible via an opening 1081 defined by the housing 1068 of the lineal base 1026 and leading into the recess 1071. The opening 1081 to the recess 1071 extends along the entire lineal base 1026 parallel to the length and perpendicular to the depth.

Moreover, in FIG. 8B, the removable lineal cap 1029 is shown separated from the rest of the lineal member 1001. The removable lineal cap 1029 is configured to attach to the lineal base 1026 for covering the opening 1081 to the stacked screw boss 1036 and for covering a portion of the lineal member 1001 around the opening 1081. The removable lineal cap 1029, specifically, is configured to flex around a portion of the lineal base 1026 and grip the lineal base 1026. Furthermore, the removable lineal cap 1029 has two ledge-surfaces 1088 each on opposite sides of the removable lineal cap 1029, and each configured to engage with a corresponding ledge surface 1090 on the lineal base 1026 for attaching the removable lineal cap 1029 to the lineal base 1026. Entirely optional, the removable lineal cap 1028 may have two legs 1086 configured to press-fit into the opening 881 to provide further protection against contaminant or moisture intrusion into the lineal base through the opening 1081.

Figure 9A:
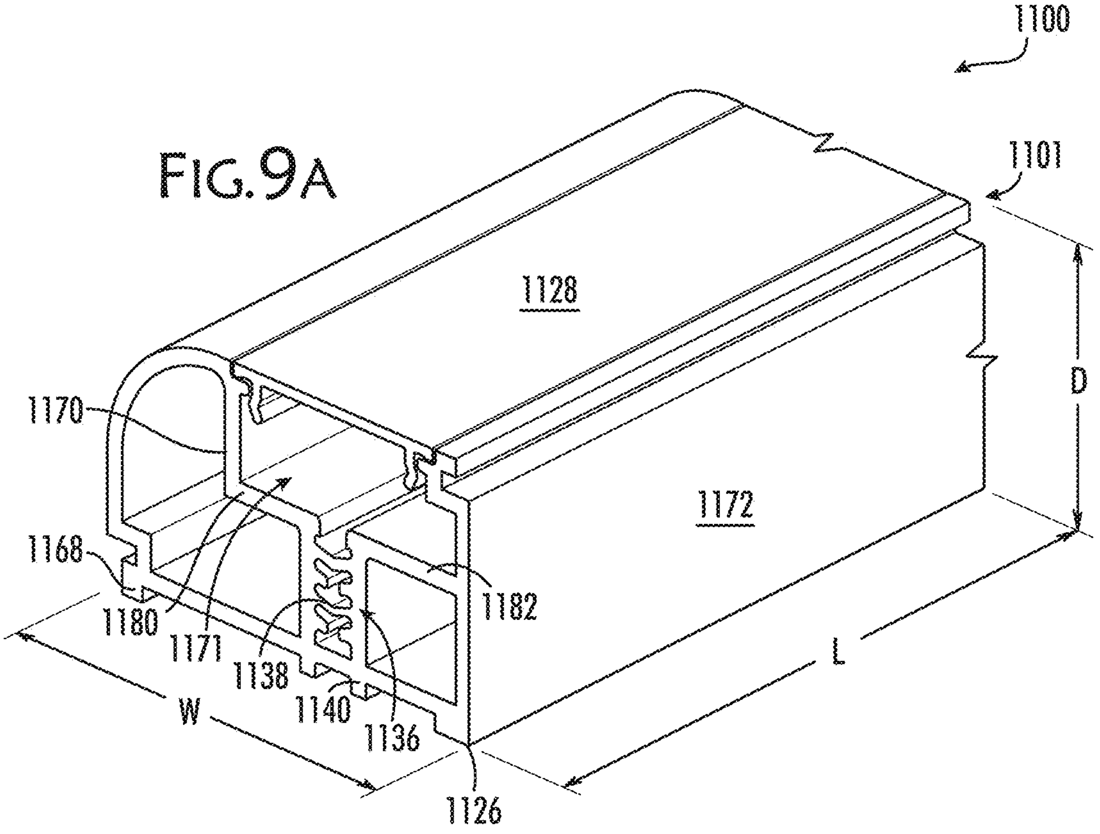
FIG. 9A is a perspective view of a partial illustration of an example lineal member of an example storm trim system according to the present disclosure.
Figure 9B:
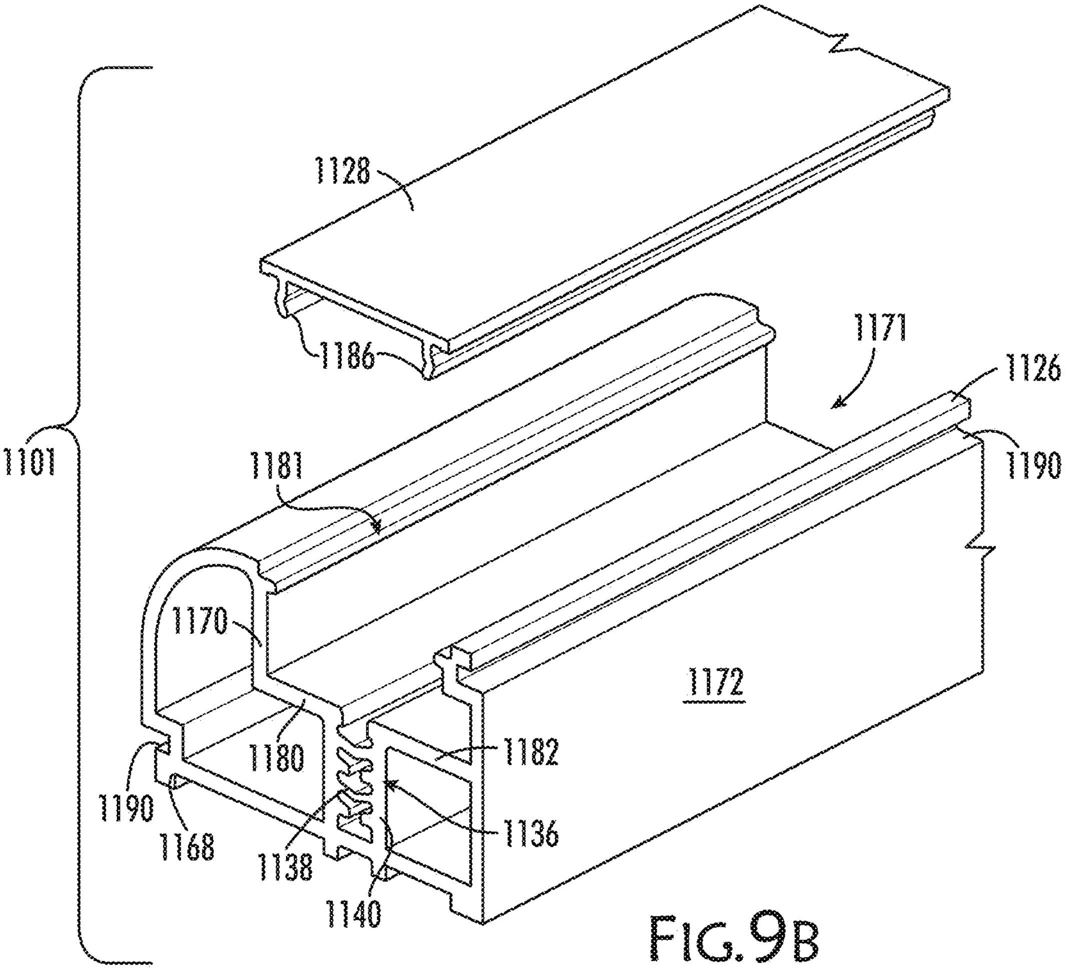
FIG. 9B is an exploded perspective view of a partial illustration of an example lineal member of an example storm trim system according to the present disclosure.

Referring now to FIGS. 9A and 9B, FIG. 9A is a perspective view of a partial illustration of an example lineal member of an example storm trim system according to the present disclosure, and FIG. 9B is an exploded perspective view of a partial illustration of an example lineal member of an example storm trim system according to the present disclosure. In particular, in FIGS. 9A and 9B, there is shown a free standing storm trim system 1100. As illustrated, the storm trim system 1100 includes a lineal member 1101 having a lineal base 1126 with integral stacked screw boss 1136, and a removable lineal cap 1128.

More specifically, in FIG. 9A, the lineal member 1101 of the storm trim system 1100 is shown fully assembled, and the storm trim member 1101 includes a lineal base 1126 having a length, L, a depth, D, and a width, W, and a stacked screw boss formed therein running perpendicular to the length and parallel to the depth. The stacked screw boss is accessible via an opening 1181 defined by the housing 1168 of the lineal base 1126 and leading into the recess 1171. The opening 1181 to the recess 1171 extends along the entire lineal base 1126 parallel to the length and perpendicular to the depth.

Moreover, in FIG. 9B, the removable lineal cap 1128 is shown separated from the rest of the lineal member 1101. The removable lineal cap 1128 is configured to attach to the lineal base 1126 for covering the opening 1181 to the stacked screw boss 1136. The removable lineal cap 1128 has two legs 1186 configured to press-fit into the opening 1181. Entirely optional, the lineal base 1126 may have ledge surface 1190 for attaching any after-market add-ons to the lineal base 1126.

IV. Embodiments

Certain implementations of systems and methods consistent with the present disclosure are provided as follows:

Implementation 1: A storm trim system for use in attaching a panel over a window frame, comprising:

(i) a lineal base having a length, a depth, and a stacked screw boss formed therein running perpendicular to the length and parallel to the depth, the stacked screw boss accessible via an opening defined by the lineal base, the opening extending along the lineal base parallel to the length and perpendicular to the depth; and (ii) a first removable lineal cap being attachable to the lineal base for covering the opening to the stacked screw boss, the first removable lineal cap having two legs configured to press-fit into the opening.

Implementation 2: The storm trim of implementation 1, further comprising:

(iii) a second removable lineal cap being attachable to the lineal base for further covering the opening over the first removable lineal cap or for covering the opening when the first removable lineal cap is removed from the lineal base, the second removable lineal cap being configured to flex around a portion of the lineal base and grip the lineal base.

Implementation 3: The storm trim of implementation 1, wherein the lineal base is configured to be installed onto the window frame or onto the structure of a building having a window frame.

Implementation 4: The storm trim of implementation 3, wherein the lineal base is configured to be installed onto wood, brick, concrete, masonry, stone, plastic, vinyl, and composite structures.

Implementation 5: The storm trim of implementation 1, wherein the lineal base is made of extruded vinyl.

Implementation 6: The storm trim of implementation 1, wherein the opening has a width, wherein the stacked screw boss has a width and at least two channels, and wherein one channel of the at least two channels is on top of another channel of the at least two channels.

Implementation 7: The storm trim of implementation 1, wherein the opening extends along the entire length of the lineal base.

Implementation 8: The storm trim of implementation 2, wherein the first removable lineal cap and the second removable lineal cap are made of extruded vinyl.

Implementation 9: The storm trim of implementation 2, wherein the second removable lineal cap has two ledge-surfaces, wherein each of the two ledge-surfaces is on opposite sides of the second removable lineal cap, and wherein each of the two ledge-surfaces is configured to engage with a corresponding ledge surface on the lineal base for attaching the second removable lineal cap to the lineal base.

Implementation 10: The storm trim of implementation 2, wherein the second removable lineal cap defines a curved portion.

Implementation 11: A storm trim for use in attaching a panel over a window frame, comprising:

(a) a lineal base having a length, a depth, and a stacked screw boss formed therein running perpendicular to the length and parallel to the depth, the stacked screw boss accessible via an opening defined by the lineal base, the opening extending along the lineal base parallel to the length and perpendicular to the depth;

(b) a first removable lineal cap being attachable to the lineal base for covering the opening to the stacked screw boss, the first removable lineal cap having two legs configured to press-fit into the opening; and (c) a second removable lineal cap being attachable to the lineal base for further covering the opening over the first removable lineal cap or for covering the opening when the first removable lineal cap is removed from the lineal base, the second removable lineal cap having a curved portion and two ledge-surfaces, each, on opposite sides of the second removable lineal cap, with one ledge-surface of the two ledge-surfaces at the end of the curved portion, and each of the two ledge-surfaces configured to engage with a corresponding ledge surface on the lineal base for attaching the second removable lineal cap to the lineal base, the second removable lineal cap being configured to flex around a portion of the lineal base and grip the lineal base with the two ledge-surfaces.

Implementation 12: The storm trim of claim 11, wherein the lineal base is configured to be installed onto the window frame.

Implementation 13: The storm trim of implementation 11, wherein the lineal base is configured to be installed onto the structure of a building having a window frame.

Implementation 14: The storm trim of implementation 13, wherein the lineal base is configured to be installed onto wood, brick, concrete, masonry, stone, plastic, vinyl, and composite structures.

Implementation 15: The storm trim of implementation 11, wherein the lineal base is made of extruded vinyl.

Implementation 16: The storm trim of implementation 11, wherein the opening has a width, wherein the stacked screw boss has a width and at least two channels, and wherein one channel of the at least two channels is on top of another channel of the at least two channels.

Implementation 17: The storm trim of implementation 11, wherein the opening extends along the entire length of the lineal base.

Implementation 18: The storm trim of implementation 11, wherein the first removable lineal cap and the second removable lineal cap are made of extruded vinyl.

Implementation 19: A method of using a storm trim system, the method comprising:

(a) providing an extruded lineal base having a length, a depth, and a stacked screw boss formed therein running perpendicular to the length and parallel to the depth, the stacked screw boss accessible via an opening defined by the lineal base, the opening extending along the lineal base parallel to the length and perpendicular to the depth;

(b) providing a first removable lineal cap being attachable to the lineal base for covering the opening to the stacked screw boss, the first removable lineal cap having two legs configured to press-fit into the opening; and (c) providing a second removable lineal cap being attachable to the lineal base for further covering the opening over the first removable lineal cap or for covering the opening when the first removable lineal cap is removed from the lineal base, the second removable lineal cap being configured to flex around a portion of the lineal base and grip the lineal base.

Implementation 20: The method of implementation 19, further comprising installing the extruded lineal base onto a building.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A storm trim system for use in attaching a panel over a window frame, comprising:

(i) a lineal base having a length, a depth, and a stacked screw boss formed therein running perpendicular to the length and parallel to the depth, the stacked screw boss accessible via an opening defined by the lineal base, the opening extending along the lineal base parallel to the length and perpendicular to the depth;

(ii) a first removable lineal cap being attachable to the lineal base for covering the opening to the stacked screw boss, the first removable lineal cap having two legs configured to press-fit into the opening; and (iii) a second removable lineal cap being attachable to the lineal base for further covering the opening over the first removable lineal cap or for covering the opening when the first removable lineal cap is removed from the lineal base, the second removable lineal cap being configured to flex around a portion of the lineal base and grip the lineal base.

2. The storm trim of claim 1, wherein the lineal base is configured to be installed onto the window frame or the structure of a building having a window frame.

3. The storm trim of claim 2, wherein the lineal base is configured to be installed onto wood, brick, concrete, masonry, stone, plastic, vinyl, and composite structures.

4. The storm trim of claim 1, wherein the lineal base is made of extruded vinyl.

5. The storm trim of claim 1, wherein the opening has a width, wherein the stacked screw boss has a width and at least two channels, and wherein one channel of the at least two channels is on top of another channel of the at least two channels.

6. The storm trim of claim 1, wherein the opening extends along the entire length of the lineal base.

7. The storm trim of claim 1, wherein the first removable lineal cap and the second removable lineal cap are made of extruded vinyl.

8. The storm trim of claim 1, wherein the second removable lineal cap has two ledge-surfaces, wherein each of the two ledge-surfaces is on opposite sides of the second removable lineal cap, and wherein each of the two ledge-surfaces is configured to engage with a corresponding ledge surface on the lineal base for attaching the second removable lineal cap to the lineal base.

9. The storm trim of claim 1, wherein the second removable lineal cap defines a curved portion.

10. A storm trim for use in attaching a panel over a window frame, comprising:

(a) a lineal base having a length, a depth, and a stacked screw boss formed therein running perpendicular to the length and parallel to the depth, the stacked screw boss accessible via an opening defined by the lineal base, the opening extending along the lineal base parallel to the length and perpendicular to the depth;

(b) a first removable lineal cap being attachable to the lineal base for covering the opening to the stacked screw boss, the first removable lineal cap having two legs configured to press-fit into the opening; and (c) a second removable lineal cap being attachable to the lineal base for further covering the opening over the first removable lineal cap or for covering the opening when the first removable lineal cap is removed from the lineal base, the second removable lineal cap having a curved portion and two ledge-surfaces, each, on opposite sides of the second removable lineal cap, with one ledge-surface of the two ledge-surfaces at the end of the curved portion, and each of the two ledge-surfaces configured to engage with a corresponding ledge surface on the lineal base for attaching the second removable lineal cap to the lineal base, the second removable lineal cap being configured to flex around a portion of the lineal base and grip the lineal base with the two ledge-surfaces.

11. The storm trim of claim 10, wherein the lineal base is configured to be installed onto the window frame.

12. The storm trim of claim 10, wherein the lineal base is configured to be installed onto the structure of a building having a window frame.

13. The storm trim of claim 12, wherein the lineal base is configured to be installed onto wood, brick, concrete, masonry, stone, plastic, vinyl, and composite structures.

14. The storm trim of claim 10, wherein the lineal base is made of extruded vinyl.

15. The storm trim of claim 10, wherein the opening has a width, wherein the stacked screw boss has a width and at least two channels, and wherein one channel of the at least two channels is on top of another channel of the at least two channels.

16. The storm trim of claim 10, wherein the opening extends along the entire length of the lineal base.

17. The storm trim of claim 10, wherein the first removable lineal cap and the second removable lineal cap are made of extruded vinyl.

18. A method of using a storm trim system, the method comprising:

(a) providing an extruded lineal base having a length, a depth, and a stacked screw boss formed therein running perpendicular to the length and parallel to the depth, the stacked screw boss accessible via an opening defined by the lineal base, the opening extending along the lineal base parallel to the length and perpendicular to the depth;

(b) providing a first removable lineal cap being attachable to the lineal base for covering the opening to the stacked screw boss, the first removable lineal cap having two legs configured to press-fit into the opening; and (c) providing a second removable lineal cap being attachable to the lineal base for further covering the opening over the first removable lineal cap or for covering the opening when the first removable lineal cap is removed from the lineal base, the second removable lineal cap being configured to flex around a portion of the lineal base and grip the lineal base.

19. The method of claim 18, further comprising installing the extruded lineal base onto a building.

* * * * *